United States Patent
Shermer

(10) Patent No.: US 6,685,256 B1
(45) Date of Patent: Feb. 3, 2004

(54) TRAILER DRAG REDUCTION SYSTEM

(76) Inventor: Carl L. Shermer, 2640 Melqne Ave., Grove City, OH (US) 43123

( * ) Notice: Subject to any disclaimer, the term of this patent is extended or adjusted under 35 U.S.C. 154(b) by 0 days.

(21) Appl. No.: 10/324,258

(22) Filed: Dec. 23, 2002

(51) Int. Cl.[7] ............................................. B60J 1/00
(52) U.S. Cl. ............... 296/180.4; 296/208; 296/180.1
(58) Field of Search ............................ 296/180.4, 180.3, 296/180.1, 180.2, 91, 181, 180.5, 208; 105/1.2; 280/204, 851; 244/130, 3.3; 180/89.1, 68.1, 229; 165/44

(56) References Cited

U.S. PATENT DOCUMENTS

| | | | |
|---|---|---|---|
| 926,971 A | | 7/1909 | Ahrens |
| 1,871,396 A | * | 8/1932 | Stalker .................. 296/180.1 |
| 1,934,385 A | * | 11/1933 | Strauss .................. 180/89.1 |
| 2,021,784 A | * | 11/1935 | Hochstadt .................. 296/208 |
| 2,037,942 A | * | 4/1936 | Stalker .................. 296/208 |
| 2,199,883 A | * | 5/1940 | Ishiwata .................. 296/208 |
| 2,242,494 A | * | 5/1941 | Wolf .................. 296/91 |
| 2,514,695 A | | 7/1950 | Dempsey .................. 296/28 |
| 2,886,120 A | * | 5/1959 | Lee et al. .................. 180/68.1 |
| 3,563,598 A | * | 2/1971 | Wilfert et al. .................. 296/208 |
| 3,743,343 A | * | 7/1973 | Grote et al. .................. 296/180.4 |
| 3,791,468 A | * | 2/1974 | Bryan, Jr. .................. 296/180.1 |
| 3,910,623 A | * | 10/1975 | McKeen .................. 296/180.1 |
| 3,999,797 A | * | 12/1976 | Kirsch et al. .................. 296/180.4 |
| 4,113,299 A | * | 9/1978 | Johnson et al. .................. 296/180.4 |
| 4,343,506 A | * | 8/1982 | Saltzman .................. 296/180.2 |
| 4,457,552 A | * | 7/1984 | Katsuoka .................. 296/180.1 |
| 4,460,055 A | * | 7/1984 | Steiner .................. 296/180.1 |
| 4,601,508 A | * | 7/1986 | Kerian .................. 296/180.4 |
| 4,690,204 A | * | 9/1987 | Reichel et al. .................. 165/44 |
| 4,709,774 A | * | 12/1987 | Saito et al. .................. 180/229 |
| 4,838,603 A | * | 6/1989 | Masoero et al. .................. 296/208 |
| 4,978,162 A | | 12/1990 | Labbe .................. 296/180.2 |
| 5,054,844 A | * | 10/1991 | Miwa .................. 296/208 |
| 5,171,057 A | * | 12/1992 | Sharp .................. 296/180.4 |
| 5,236,347 A | | 8/1993 | Andrus .................. 296/180.4 |
| 5,280,990 A | * | 1/1994 | Rinard .................. 296/180.4 |
| 5,348,366 A | * | 9/1994 | Baker et al. .................. 296/180.4 |
| 5,375,903 A | * | 12/1994 | Lechner .................. 296/180.1 |
| 5,782,521 A | | 7/1998 | Anderson .................. 296/181 |
| 5,842,734 A | * | 12/1998 | Lechner .................. 296/180.4 |
| 6,196,620 B1 | * | 3/2001 | Haraway, Jr. .................. 296/180.1 |
| 6,230,836 B1 | * | 5/2001 | Cowan et al. .................. 296/180.1 |
| 6,297,486 B1 | * | 10/2001 | Rom et al. .................. 244/3.3 |
| 6,340,192 B2 | * | 1/2002 | Pike et al. .................. 296/180.1 |
| 6,354,003 B1 | * | 3/2002 | Lehmann et al. .................. 296/208 |
| 6,561,575 B2 | * | 5/2003 | Fairburn et al. .................. 296/208 |

* cited by examiner

*Primary Examiner*—Kiran Patel
(74) *Attorney, Agent, or Firm*—David A. Greenlee

(57) ABSTRACT

A system for reducing the drag on a trailer comprises a series of air ducts mounted beneath the trailer which each have an intake located beneath the trailer. The duct is connected to a plurality of vertical pipes, each having vertically-spaced pipes air discharge holes. Movement of the trailer forces air to flow into the inlet, through the ducts and out the outlets. Preferably, the duct inlets face the front and the side of the trailer, and the ducting forces all inlet air into a common plenum, through a venturi and out through a series if outlets spaced about the rear surface of the trailer. A vortex generator may be used and a spoiler is fitted. The entire system is designed to be retrofitted to existing trailers without loss of cargo space.

5 Claims, 2 Drawing Sheets

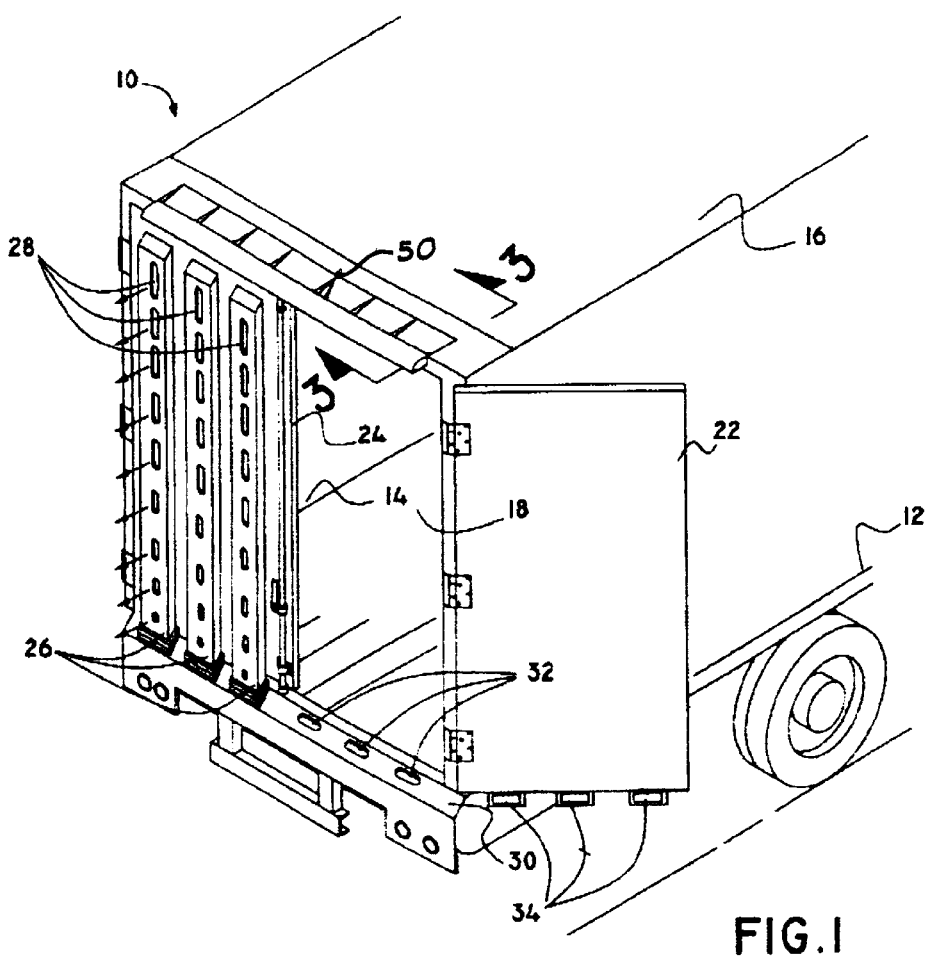
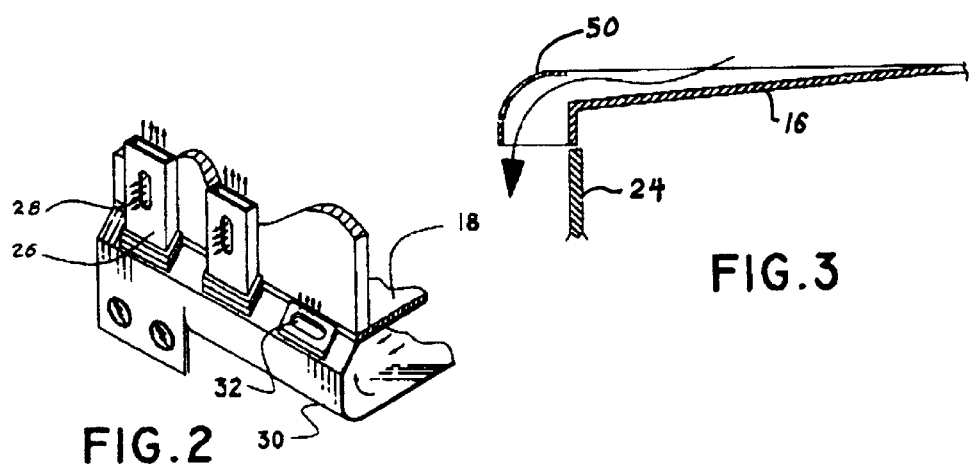

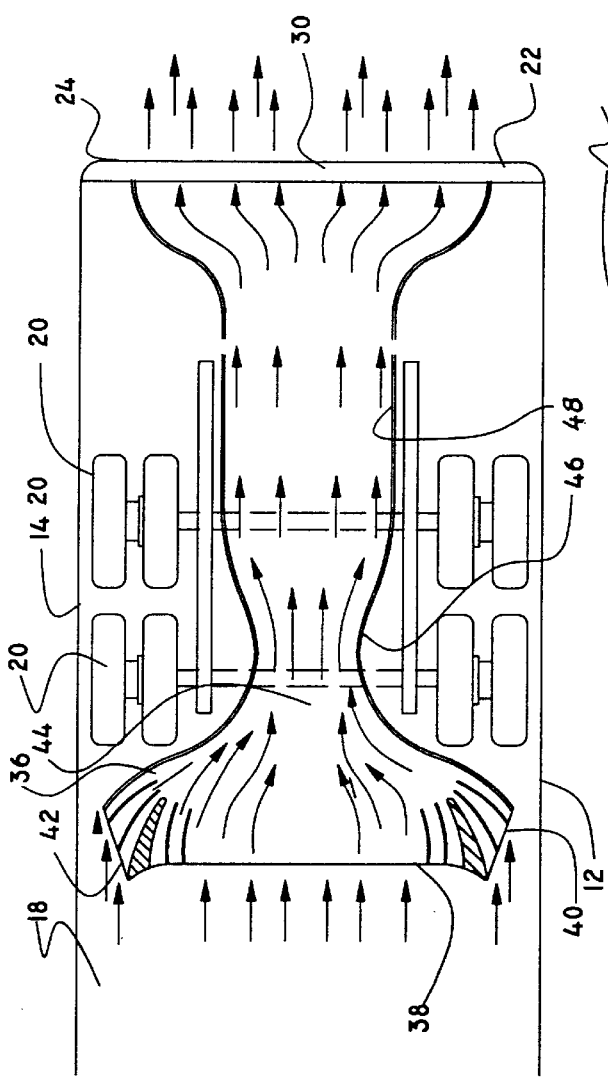
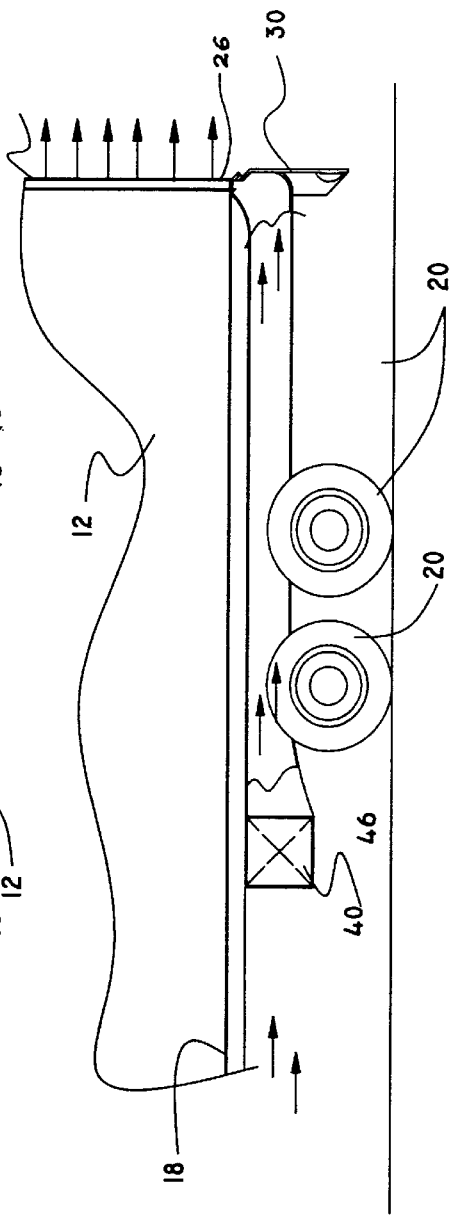
FIG. 4
FIG. 5

TRAILER DRAG REDUCTION SYSTEM

BACKGROUND OF THE INVENTION

1. Field of the Invention

This invention relates generally to over-the-road semi-trailers and, more specifically, to a system for reducing aerodynamic drag incurred by the shape and speed of the trailer.

2. Prior Art

Over-the-road semi-trailers are usually shaped like rectangular solids. This shape maximizes the loadable volume of the trailer for its size. It has long been known that shape causes substantial aerodynamic drag, which increases with the speed of the trailer, and increases fuel consumption. This drag was not a significant economic problem when gasoline and diesel fuel were inexpensive. However in recent years, fuel prices have skyrocketed and continue to be quite unstable. Thus, reduction in drag has a significant impact on gas mileage of tractor-trailers, which affects operation costs and, ultimately on profitability.

This drag has two components. One is the headwind resistance caused by the large flat front of the trailer impacting the air mass as it moves through it. For this reason, many commercial shippers mount a bubble on the upper front of the trailer, or provide the tractor with a wind deflector. The other component is rear turbulence, caused by the flat rear of the trailer, which causes eddying of the air as it passes around the trailer.

Many attempts have been made to reduce this eddying, most notably the addition of a "bustle" to the rear of the trailer. This approach can be seen in U.S. Pat. No. 5,375,903—Lechner, U.S. Pat. No. 4,978,162—Labbe, and U.S. Pat. No. 5,236,347—Andrus, for example. All of these devices are bulky, cumbersome and expensive. They effectively reduce the length, and necessarily carg capacity, of the trailer in states where there are length restrictions. None of them have been commercially successful.

Another approach has been to duct air from the front of the trailer through ducting within the trailer and eject this air at the rear of the trailer. This approach dates back nearly a century in application to rail cars, as exemplified by U.S. Pat. No. 926,971—Ahrens. More recent examples of this approach applied to semi-trailers are seen in U.S. Pat. No. 5,782,521—Anderson, and U.S. Pat. No. 2,514,695—Dempsey. In all of these, the ducted aor occupies internal volume of the trailer, necessitating a reduction in cargo capacity.

Thers is a need for a system of reducing drag for a trailer that is simnple, and does not reduce the cargo capacity of the trailer.

SUMMARY OF THE INVENTION

It is therefore an object of this invention to provide a system of improving gas mileage of a tractor-trailer by reducing drag, that is simple, and does not reduce the cargo capacity of the trailer.

In one aspect, this invention features a system for reducing the drag on a trailer, comprising air ducting mounted beneath the trailer which has an intake located beneath the trailer, and an outlet located on the flat rear surface of the trailer, whereby movement of the trailer forces air to flow into the intlet, through the ducts and out the outlets. Preferably, the duct inlets face the front and the side of the trailer, and the ducting forces all inlet air into a common plenum, through a venturi and out through a series if outlets spaced about the rear surface of the trailer.

These and other objects and features of this invention will become more readily apparent from reference to the following detailed description of a preferrred embodiment and the attached drawings, in which:

BRIEF DESCRIPTION OF THE DRAWINGS

FIG. 1 is a partial perspective view of a trailer drag reduction system according to this invention;

FIG. 2 is an enlarged detail view of a portion of FIG. 1;

FIG. 3 is a partial sectional view, taken along line 3—3 of FIG. 1;

FIG. 4 is a bottom view of the system of FIG. 1; and

FIG. 5 is a side view of FIG. 4.

DETAILED DESCRIPTION OF A PREFERRED EMBODIMENT

As shown in FIG. 1, a semi-trailer 10 is of the type which is conventionally supported on, and pulled by a tractor (not illustrated). Trailer 10 includes spaced sides 12 and 14, a top 16 and a floor 18 which define a cargo-carrying interior that has the shape of a rectangular solid. Trailer 10 is conventionally supported on a dual axle undercarriage 20. Access to the trailer interior is through a pair of rear doors 22 (shown open) and 24 (shown closed).

Each rear door 22, 24 mounts three spaced, identical vertical pipes 26, each of which has a plurality of spaced outlet holes 28 for discharging air, as will be described later, to break up the air turbulence which conventionally occurs adjacent the doors when the trailer is at highway speeds. As illustrated, a manifold 30 extends horizontally adjacent the lower edge of doors 22, 24 and has six spaced transfer ports 32, each of which registers with an inlet port 34 at the lower end of a pipe 26.

As seen in FIGS. 4 and 5, manifold 30 is provided with air from a ducting system 36 located beneath floor 18. Ducting system 36 includes a wide forward-facing inlet 38 and a pair of side inlets 40, 42. As trailer moves through the air mass, ambient air is forced through inlets 38, 40 and 42 into a plenum 44. From there air flows through a venturi 46 and a delivery channel 48 to manifold 30. From there, the air is forced vertically up pipes 26 and out of outlet holes 28 to break the partial mmediately behind trailer, as best seen in FIGS. 1 and 2. Note that the sizes of holes 28 are graduated, from the smallest at the bottoms of pipes 26, to the largest at the tops of pipes 26. This approximately equalizes the volume of air discharges from all holes 28. Vortex generators may be added adjacent inlets 38, 40, 42 to disrupt and channel air flow to venturi 46.

To aid in air flow, a spoiler or air deflector 50 is fitted to the top rear edge of trailer 10, as shown in FIG. 3, while the bottom of plenum 30 is rounded (FIGS. 2 and 5).

This system will reduce the drag caused by the turbulence in the partial vacuum that conventional trailers normally create immediately behind them during motion. All parts are designed as add-ons that may be retrofitted to any conventional trailer. Ducting system 36 is easily mountable between the undercarriage 20 and trailer floor 18, while manifold 30 mounts just below doors 22, 24 and pipes 26 are easily secured to the rear face of doors 22, 24. Because of this design, no cargo space is lost or sacrificed, and the system can be mounted as original equipment or as an aftermarket add-on. As an alternative, the system could easily be accommodated in the original trailer design and offered as original equipment. In this case, the air discharge ducting could easily be designed as an integral part of the rear trailer doors Optionally, doors incorporating the. ducting could be offered as an aftermarket conversion.

It is thought that venturi 46 improves air flow through the system, but that it is not absolutely necessary to the functioning of this invention. Similarly spoiler 50 may be optionally omitted, although it is thought that it facilitates air flow.

While only a preferred embodiment of this invention has been disclosed and described, obvious modifications will occur to those skilled in the art and are within the scope of this invention, as defined by the appended claims.

I claim:

1. A system for reducing the drag on a trailer having rear doors that provide a substantially flat rear surface, comprising a series of air ducts mounted beneath the trailer and each having an intake located beneath the trailer, laterally-spaced vertical pipes mounted on the doors, a plurality of outlet ports vertically spaced along to pipes, said outlet ports being sized to discharge approximately the same volume of air, and a manifold extending along the bottom of the trailer below the doors, said manifold receiving air from the intakes and distributing it to the vertical pipes, whereby movement of the trailer forces air to flow into the inlet, through the ducts and out the outlets.

2. The system of claim 1, wherein the ducts all interconnect between the inlets and outlets to force the inlet air into a common transit duct, said transit duct incorporating a venturi.

3. The system of claim 1, wherein the outlet ports are graduated in size, from the smallest at the bottom to the largest at the top of each pipe.

4. The system of claim 3, wherein the system is configured to attach to any conventional trailer, with the ducting being attachable beneath the trailer and the pipes being attached to the rear doors of the trailer.

5. The system of claim 1, wherein the system is provided as original equipment for an otherwise conventional trailer, with the pipes being formed integrady with the rear doors of the trailer.

\* \* \* \* \*